(12) United States Patent
Molenaar

(10) Patent No.: US 7,751,979 B2
(45) Date of Patent: Jul. 6, 2010

(54) DETERMINING IN-SITU THE RELATION BETWEEN SEISMIC VELOCITY AND STATE OF STRESS IN AN UNDERGROUND FORMATION

(75) Inventor: Menno Mathieu Molenaar, Rijswijk (NL)

(73) Assignee: Shell Oil Company, Houston, TX (US)

( * ) Notice: Subject to any disclaimer, the term of this patent is extended or adjusted under 35 U.S.C. 154(b) by 778 days.

(21) Appl. No.: 11/631,057

(22) PCT Filed: Jun. 28, 2005

(86) PCT No.: PCT/EP2005/053013

§ 371 (c)(1),
(2), (4) Date: Dec. 28, 2006

(87) PCT Pub. No.: WO2006/003137

PCT Pub. Date: Jan. 12, 2006

(65) Prior Publication Data

US 2009/0192716 A1    Jul. 30, 2009

(30) Foreign Application Priority Data

Jun. 30, 2004  (EP)  ................................. 04253932

(51) Int. Cl.
G06F 19/00  (2006.01)
(52) U.S. Cl. ........................................................ 702/11
(58) Field of Classification Search .................. 702/11, 702/14, 182–185, 188
See application file for complete search history.

(56) References Cited

U.S. PATENT DOCUMENTS 4,969,130 A   11/1990  Wason et al. ................ 367/73

| | | | |
|---|---|---|---|
| 5,040,414 A | 8/1991 | Graebner | 73/151 |
| 5,081,612 A | 1/1992 | Scott | 367/38 |
| 5,197,038 A | 3/1993 | Chang | 367/28 |
| 5,200,929 A | 4/1993 | Bowers | 367/38 |

(Continued)

FOREIGN PATENT DOCUMENTS

WO    2005040860    5/2005

OTHER PUBLICATIONS

K.C. Schulze, et al:"Estimation of In-Situ Rock parameters from pressure Time Series", SPE/ISRM 78249, Society of Petroleum Engineers, presented at SPE/ISRM rock mechanics conference Irving, Texas, Oct. 20-23, 2002.

(Continued)

*Primary Examiner*—Edward Raymond

(57) ABSTRACT

A method of determining in-situ a relation between the seismic velocity and the state of stress in an underground formation located under a surface subjected to time-changing surface loading conditions. A relation is selected between the seismic velocity and the state of stress containing at least one unknown parameter. A seismic source is arranged at surface or in a borehole penetrating the underground formation, and a seismic receiver is arranged at a distance from the seismic source at surface or in a second borehole. At two different times the seismic velocity of the formation along a path from the seismic source to the seismic receiver is determined. The difference in surface loading conditions at the two times is converted in a difference in states of stress in the underground formation. The unknown parameter(s) are calculated to obtain the relation between the seismic velocity and the state of stress in the underground formation.

20 Claims, 1 Drawing Sheet

U.S. PATENT DOCUMENTS

| | | | |
|---|---|---|---|
| 5,615,115 | A | 3/1997 | Shilling ................... 364/421 |
| 5,724,311 | A | 3/1998 | Laurent et al. ............. 367/57 |
| 5,859,367 | A | 1/1999 | Holbrook ................ 73/152.05 |
| 5,946,271 | A | 8/1999 | Dragoset, Jr. ............. 367/38 |
| 6,041,018 | A | 3/2000 | Roche ...................... 367/46 |
| 6,389,361 | B1 | 5/2002 | Geiser ...................... 702/15 |
| 6,434,487 | B1 | 8/2002 | Thompson ................ 702/14 |
| 6,438,069 | B1 | 8/2002 | Ross et al. ................. 367/73 |
| 6,473,696 | B1 * | 10/2002 | Onyia et al. ................ 702/6 |
| 6,614,717 | B1 | 9/2003 | Khan et al. ............... 367/46 |
| 6,715,551 | B2 | 4/2004 | Curtis et al. ......... 166/250.16 |
| 6,894,949 | B2 | 5/2005 | Aronstam .................. 367/57 |
| 6,977,866 | B2 * | 12/2005 | Huffman et al. ........... 367/73 |
| 2002/0128777 | A1 | 9/2002 | Fanini et al. ............... 702/11 |
| 2002/0169559 | A1 * | 11/2002 | Onyia et al. ............... 702/14 |
| 2003/0004648 | A1 * | 1/2003 | Huffman et al. ........... 702/14 |
| 2003/0125878 | A1 | 7/2003 | Bakulin et al. ............. 702/14 |

OTHER PUBLICATIONS

Martin Landro: "Discrimination between pressure and fluid saturation changes from time-lapse data", Geophysics, Seg., vol. 66, No. 3, Jun. 1, 2001, pp. 836-844.

Griffiths Khaksar,:"Influence of effective stress on the acoustic velocity and log drived porosity", Society of Petroleum engineers, SPE, Oct. 28, 1996, pp. 173-181.

M.A. Biot: Theory of propagation of elastic waves in a fluid-saturated porous solid: I Low Frequency Range, Jrnl. of the Acoustical Society of America, vol. 28, pp. 168-178, 1956.

I.S. Bell: "Rock at Great Depth", V. Maury & Fourmaintraux (Eds), vol. 3, 1990 Balkema/Rotterdam/Brookfield, pp. 1243-1261.

Jean-Paul Mouchet and Alan Mitchell: "Abnormal Pressures while drilling", Boussens 1989, p. 76.

* cited by examiner

DETERMINING IN-SITU THE RELATION BETWEEN SEISMIC VELOCITY AND STATE OF STRESS IN AN UNDERGROUND FORMATION The present application claims priority on European Patent Application 04253932.0 filed 30 Jun. 2004.

FIELD OF THE INVENTION

The present invention relates to determining the relation between the seismic velocity and the state of stress in an underground formation. The relation is used in producing a stress dependent seismic survey based on geomechanical modelling of an underground formation.

BACKGROUND OF THE INVENTION

Time-lapse seismic is used to detect changes in a reservoir that occur between a first survey and a second survey after a predetermined time. The time between two successive surveys is so determined that a change in the underground formation can be detected. In many instances time-lapse seismic surveying is done to study changes in an underground reservoir.

An example of time-lapse seismic monitoring is described in U.S. Pat. No. 4,969,130. This publication discloses monitoring the fluid contents of a petroleum reservoir, wherein a reservoir model is employed to predict the fluid flow in the reservoir, which monitoring includes a check on the reservoir model by comparison of synthetic seismic surveys with the observed seismic surveys. If the synthetic output predicted by the model agrees with the observed seismic data, it is assumed that the reservoir has been properly modelled. If not then the reservoir model, in particular its reservoir description, is updated until it predicts the observed seismic response. The seismic survey and the technique used to update the reservoir model may be periodically repeated during the productive life of the reservoir, so as to ensure that the revised reservoir description predicts the observed changes in the seismic data and hence reflects the current status of fluid saturations.

In the known method a synthetic seismic survey (or a synthetic seismogram) is produced in order to allow a comparison with the recorded seismic surveys. The synthetic seismic survey is made on the basis of a reservoir model that allows predicting the flow of fluids through the reservoir, and a geomechanical model that allows predicting the deformations of layers in the underground formation.

An essential property for modelling the underground formation is the dependency of the seismic velocity on the state of stress in the formation. The seismic velocity is the propagation rate of a seismic wave through the underground formation, and the state of stress is defined by the magnitude and direction of normal and shearing stresses acting on an element of the underground formation, which element has a known orientation. The state of stress in the underground formation is represented by a stress tensor that is characterized by its stress components. An example of a stress component is the vertical stress in the underground formation. The components of the stress tensor can be combined in many ways to yield a stress condition. A first example of the stress condition is the vertical stress. Another example of the stress condition is the average of the normal stresses, and a further example is a principal stress. The stress conditions can be used as a measure for the state of stress.

The seismic velocity that is of interest here is the velocity determined by the travel time from a seismic source, along a path through the underground formation, to a seismic receiver that is arranged at a distance from the seismic source. The distance between source and receiver is preferably at least 100 m, typically several hundreds of meters to kilometers. In this way, seismic velocities and travel times along pathways in the same order of magnitude are probed as in seismic surveying. This is different from sonic logging techniques such as disclosed U.S. Pat. No. 5,197,038, in which sonic velocity locally at a distance of the order of 1 meter is probed. Deriving long-distance seismic velocities from sonic measurements is a very complicated task.

It is an object of the present invention to provide a simple method of determining the relation between the seismic velocity and the state of stress in the formation that can be carried out in-situ. More in particular the present invention relates to determining a relation between a change in the seismic velocity and a change in the stress for an underground formation that is located under a surface having time-changing surface loading conditions.

SUMMARY OF THE INVENTION

The invention provides a method of determining in-situ a relation between the seismic velocity and the state of stress in an underground formation located under a surface subjected to time-changing surface loading conditions, comprising the steps of
  selecting a relation between the seismic velocity and the state of stress, which relation contains at least one unknown parameter;
  determining at two different times the seismic velocity of the formation along a path from a seismic source to a seismic receiver;
  converting the difference in surface loading conditions at the two times in a difference in states of stress in the underground formation; and
  calculating the unknown parameter(s) that determine(s) the relation from the seismic velocities and the states of stress to obtain the relation between the seismic velocity and the state of stress in the underground formation.

Optionally, the method further comprises placing the seismic source at surface or in a borehole placing the seismic source at surface or in a borehole penetrating the underground formation, and the seismic receiver at a distance from the seismic source at surface or in a second borehole, prior to determining the seismic velocity at two different times.

BRIEF DESCRIPTION OF THE DRAWINGS

The drawing shows schematically and not to scale a cross-section of a homogeneous underground formation 1 with paths of seismic waves.

DETAILED DESCRIPTION OF THE INVENTION

Figure 1:
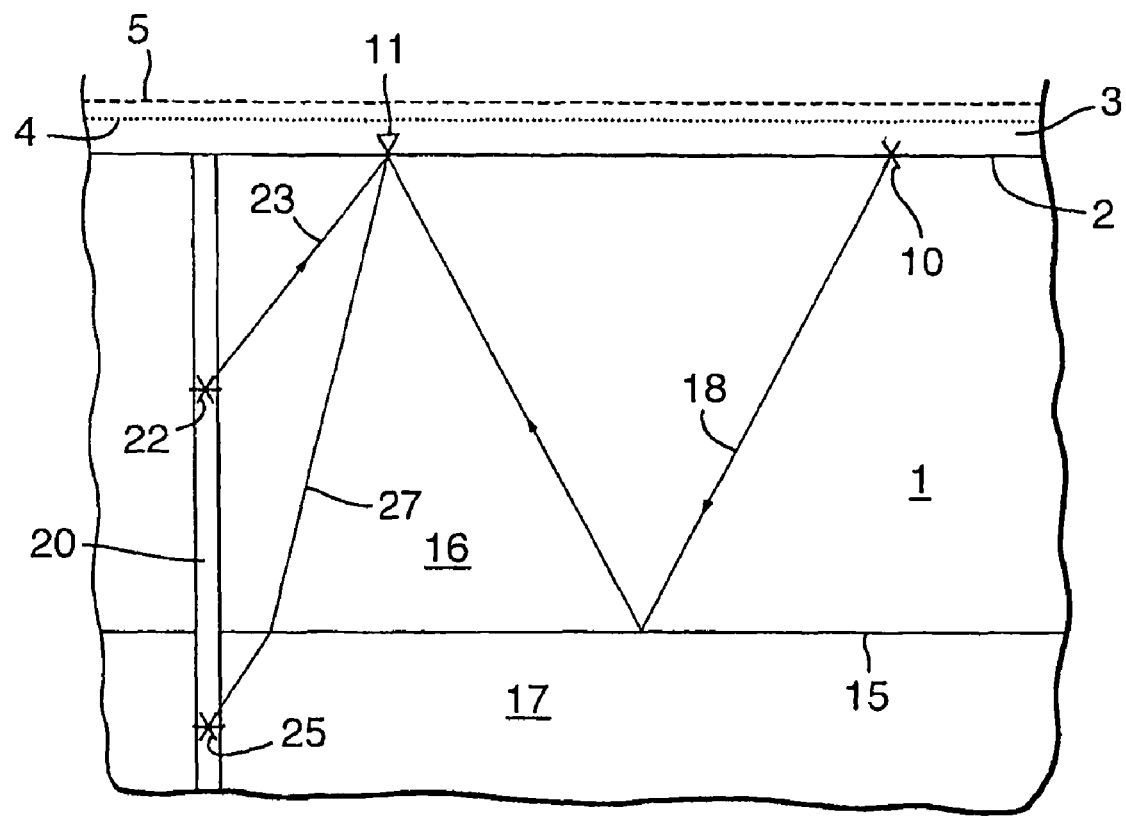

Described is a method of determining in-situ a relation between the seismic velocity and the state of stress in an underground formation located under a surface subjected to time-changing surface loading conditions.

An example of a surface loading condition that changes with time is the tide of the sea above the sea floor, wherein the sea floor is the surface below which the underground formation is located. Another example is a shifting sand dune in a desert.

The invention will now be described by way of example in more detail with reference to the accompanying drawing. The drawing shows schematically and not to scale a cross-section of a homogeneous underground formation illustrating paths of seismic waves. The drawing illustrates a homogeneous underground formation 1 is located below a surface 2, which is in this case a sea floor covered by a sea 3. The sea 3 has two tidal levels, a low tide shown by the dotted line 4 and a high tide shown by the dashed line 5. In this case, the tide is the surface loading condition to which the surface 2 is subjected.

On the sea floor 2 are arranged a seismic source 10 and a seismic receiver 11. The underground formation 1 contains a reflector 15 dividing the formation 1 into an upper layer 16 and a lower layer 17. The path of the seismic wave travelling from the seismic source 10 to the seismic receiver 11 via the reflector 15 is referred to with reference numeral 18. With the aid of conventional geometry the seismic velocity of the upper layer 16 of the formation 1 can be calculated from the seismic signal recorded with the seismic receiver 11, the depth of the reflector 15 and the distance between seismic source 10 and seismic receiver 11.

It will be understood that placing a seismic source and/or receiver at the surface can also mean that they are placed in the water above a sea floor. The surface seismic source 10 can also be arranged such that the seismic energy is first transmitted into the water and from the water into the subsurface below the sea floor, for example by using an air gun on a platform. The seismic receiver 11 can for example be part of an ocean bottom cable, which can comprise further receivers.

A change in tide, from low tide 4 to high tide 5, causes a change in the load acting on the subsurface formation 1. This change in load causes a change in the state of stress.

The first step of the method is selecting a relation between the seismic velocity and the state of stress, which relation contains at least one unknown parameter. The relation can as well be called a model. An example of the relation is a linear relation between the seismic velocity and the vertical stress (representing the state of stress in the formation). In a linear relation, there are two unknown parameters.

Then the seismic velocity of the formation is determined at two different times. In this case at low tide 4 and at high tide 5. As outlined in the above, the difference in tides at the two times results in a difference in the state of stress in the underground formation.

With the calculated change in the state of stress and the change in seismic velocity, the unknown parameter(s) can be calculated, in order to obtain the relation between the seismic velocity and the state of stress for the underground formation at the formation conditions and state at which the data were obtained. This relation is then used in modelling the underground formation to produce synthetic seismic signals.

Please note that the method can be applied to determine the relation between the seismic velocity and the state of stress for compressional seismic waves or for shear waves. Moreover, by changing the relative positions of source and receiver, the velocity-stress relation can be determined for various directions and pathways.

In an alternative embodiment of the invention the underground formation 1 is traversed by a borehole 20. In order to carry out the method of the present invention the borehole 20 is provided with a seismic source 22. During normal operation, the seismic source 22 emits a seismic wave that passes through the underground formation 1 and can be received by the seismic receiver 11. In the drawing we show the path 23 of the wave emitted by the seismic source 22 and arriving at the seismic receiver 11. An advantage of using seismic sources in a borehole is that the seismic velocities can be determined for more than one depth in the underground formation 1. This is of particular interest in case of a layered formation. As shown in the drawing, the wave emitted by a seismic source 25 below the reflector 15 to the seismic receiver 11 will pass along path 27. The signal recorded with the seismic receiver 11 will contain information on the lower layer 17 below the reflector as well as information on the upper layer 16 above the reflector 15.

Alternatively, the seismic source is arranged at surface and the receiver in the borehole. In a particular embodiment there is one seismic source at the surface 2, and a plurality of seismic receivers in the borehole, for example if the meaning of reference numerals 11 (originally receiver, now source) 22,25 (originally sources, now receivers) is regarded as exchanged. It is also possible to use one receiver in the borehole and to repeat the seismic measurement at various depths of the receiver.

In a further alternative embodiment (not shown) two boreholes are used, one provided with one or more seismic sources and the other (the second borehole) with one or more seismic receivers.

It will be understood that in the case that the seismic source is arranged at surface and the receiver in the borehole, this borehole, which is referred to as second borehole in the claims, can be the only borehole as shown in the drawing.

In the above we discussed one example of a surface loading condition: a change in the tide of the sea above the sea floor, which sea floor is the surface below which the underground formation is located. An advantage of this condition is that the tide changes relatively rapidly with a period of 24 hours. This period is short when we compare it to the time changes in the reservoir take, and therefore in obtaining the relation we need not take into account changes in the reservoir.

The seismic velocity between source and receiver is measured more than twice. It is possible to determine seismic velocity at more than two surface loading conditions. This can for example be required if the model has a plurality of unknown parameters.

When changing tide is the surface loading condition, the method can be carried out repeatedly to obtain a plurality of seismic velocity measurements over a period of at least 4 hours, preferably at least half a tide cycle, more preferably at least a full tide cycle. The measurements can for example be carried out quasi-continuously over a full day or more, e.g. by performing measurements on average every hour or more frequently. This can be beneficial to remove scatter (suppress noise) from the measurements, in particular when the expected change in seismic velocity under the loading difference between high and low tide is small compared to measurement accuracy and external influences such as sea waves.

The seismic velocity can further be measured for a plurality of relative locations between seismic source and seismic receiver.

It is also possible to repeat measurements over time, such that the data obtained span an extended period of time, for example as a month or more, a year or more. In this way changes in the seismic velocity over time can be determined, and monitored. This can be of interest in connection with producing reservoirs, and in particular for interpreting time-lapse ("4D") seismic surveys.

Another example of a surface loading condition that is changing with time is a shifting sand dune in a desert. This surface loading condition is suitably used in a desert environment and when the dune changes shape in a time that is short when compared to the time a change in the reservoir takes.

For the sake of completeness reference is made to USA patent specification No. 5 040 414, relating to characterizing an underground reservoir. The publication discloses that an underground reservoir can be characterized by measuring the fluid level in a borehole communicating with the reservoir with time and comparing this with tidal forces obtained from a prediction of the earth-tide (which is the periodic movement of the crust of the earth caused by gravitational attraction of the moon and the sun occurring unequally on different parts of the earth).

In addition, SPE paper 78 249 (Estimation of in-situ rock parameters from pressure time series, by K C Schulze et al) describes that changes in reservoir properties can be observed by correlating borehole pressure or fluid level in a borehole with tidal fluctuations.

None of these publications relates to determining a relation between the state of stress in the underground velocity and the seismic velocity.

I claim:

1. A method of determining in-situ a relation between the seismic velocity and the state of stress in an underground formation located under a surface subjected to time-changing surface loading conditions, which method comprises the steps of
   (a) selecting a relation between the seismic velocity and the state of stress, which relation contains at least one unknown parameter;
   (b) placing a seismic source at surface or in a borehole penetrating the underground formation, and a seismic receiver at a distance from the seismic source at surface or in a second borehole;
   (c) determining at two different times the seismic velocity of the formation along a path from the seismic source to the seismic receiver;
   (d) converting the difference in surface loading conditions at the two times in a difference in states of stress in the underground formation; and
   (e) calculating the unknown parameter(s) that determine(s) the relation from the seismic velocities and the states of stress to obtain the relation between the seismic velocity and the state of stress in the underground formation.

2. The method of claim 1, wherein steps (c) and (d) are carried out for one or more further different times.

3. The method of claim 1, wherein the underground formation is located below a sea floor and wherein the surface loading condition is a change in the tide of the sea above the sea floor.

4. The method of claim 3, wherein step (c) is carried out repeatedly to obtain a plurality of seismic velocity measurements over a period of at least 4 hours.

5. The method of claim 4, wherein the plurality of seismic velocity measurements is used to suppress noise.

6. The method of claim 1 wherein step (c) is carried out for a plurality of relative locations between seismic source and seismic receiver.

7. The method of claim 3, wherein step (c) is carried out repeatedly to obtain a plurality of seismic velocity measurements over a period of at least half a tide cycle.

8. The method of claim 3, wherein step (c) is carried out repeatedly to obtain a plurality of seismic velocity measurements over a period of at least a full tide cycle.

9. The method of claim 2, wherein the underground formation is located below a sea floor and wherein the surface loading condition is a change in the tide of the sea above the sea floor.

10. The method of claim 3, wherein step (c) is carried out for a plurality of relative locations between seismic source and seismic receiver.

11. A method of determining in-situ a relation between the seismic velocity and the state of stress in an underground formation located under a surface subjected to time-changing surface loading conditions, which method comprises the steps of
    selecting a relation between the seismic velocity and the state of stress, which relation contains at least one unknown parameter;
    using electronic data indicative of a seismic signal transmitted along a path through the formation from a seismic source to a seismic receiver located at a distance from the seismic source to determine at two different times the seismic velocity of the formation along said path;
    converting the difference in surface loading conditions at the two times in a difference in states of stress in the underground formation; and
    calculating the unknown parameter(s) that determine(s) the relation from the seismic velocities and the states of stress to obtain the relation between the seismic velocity and the state of stress in the underground formation.

12. The method of claim 11, wherein the seismic source is located at surface.

13. The method of claim 11, wherein the seismic source is located in a borehole penetrating the underground formation.

14. The method of claim 11, wherein the seismic receiver is located at surface.

15. The method of claim 11, wherein the seismic receiver is located in a borehole penetrating the underground formation.

16. The method of claim 11, wherein the steps of determining the seismic velocity at two different times and of converting the difference in surface loading conditions at the two times are carried out for one or more further different times.

17. The method of claim 11, wherein the underground formation is located below a sea floor and wherein the surface loading condition is a change in the tide of the sea above the sea floor.

18. The method of claim 17, wherein the step of determining the seismic velocity at two different times is carried out repeatedly to obtain a plurality of seismic velocity measurements over a period of at least 4 hours.

19. The method of claim 18, wherein the plurality of seismic velocity measurements is used to suppress noise.

20. The method of claim 11, wherein the step of determining the seismic velocity at two different times is carried out for a plurality of relative locations between seismic source and seismic receiver.

* * * * *